United States Patent [19]

Ho

[11] Patent Number: 4,881,568

[45] Date of Patent: Nov. 21, 1989

[54] IRRIGATION CHEMICAL DISPENSER

[76] Inventor: I-Chung Ho, 6958 Grovespring Dr., Rancho Palos Verdes, Calif. 90274

[21] Appl. No.: 215,741

[22] Filed: Jul. 6, 1988

[51] Int. Cl.⁴ .................. A01C 23/04; A01G 25/06
[52] U.S. Cl. .................... 137/268; 239/310; 422/282
[58] Field of Search .............. 137/268, 205.5; 422/261, 281, 282; 239/310

[56] References Cited

U.S. PATENT DOCUMENTS

| | | | |
|---|---|---|---|
| 2,889,995 | 6/1959 | Borell | 137/205.5 |
| 3,123,253 | 3/1964 | Lambton | 137/268 X |
| 3,194,444 | 7/1965 | Hubert | 137/205.5 |
| 3,455,054 | 7/1969 | Tibbels | 137/268 X |
| 3,474,817 | 10/1969 | Bates | 137/268 |

Primary Examiner—Alan Cohan

[57] ABSTRACT

Beneficial chemicals and water are dispensed by an irrigation system to vegetation served thereby. The irrigation system includes a water flow path in part defined by a housing of the inventive irrigation chemical dispenser. The dispenser housing includes a single-use disposable and replaceable chambered cartridge holding a premeasured supply of chemical material. The cartridge is sealingly closed by a penetrable diaphragm prior to and after its uniting with the remainder of the dispenser housing. Penetrating means are included by the dispenser for penetrating the cartridge diaphragm in response to a flow of pressurized water in the flow path, and also in response to an additional condition, if desired. The chemical material is then communicated to the flow path for dispensing to the vegetation served by the irrigation system.

14 Claims, 5 Drawing Sheets

IRRIGATION CHEMICAL DISPENSER

BACKGROUND OF THE INVENTION

The present invention relates to an irrigation chemical dispenser. More particularly, the present invention relates to a dispenser for providing water soluble or water-borne chemicals via an irrigation system to the vegetation served thereby.

A conventional dispenser for irrigation chemicals is known wherein a cup-like canister is provided which communicates with a water supply pipe of an irrigation system. A single compressed pellet of chemical material is placed into the cup-like canister. When the irrigation system operates, the water flow through the pipe is in part diverted through the canister and carries the chemical material to the vegetation by disolving or eroding the pellet of chemical material.

While this known conventional irrigation chemical dispenser is inexpensive and simple in construction and use, it also suffers from several deficiencies. For example, because the pellet of chemical material to be inserted into the cup-like canister is available in one size only, the quantity of chemical material dispensed cannot be proportioned according to the area of vegetation or number of plants served by the irrigation system. While it may be possible to attain a rough approximation of such proportioning by breaking the pellets into fractions for an irrigation system serving a small vegetation area, or providing multiple dispensers in a system serving a large vegetation area, both of these expedients are undesirable, and are inconvenient or expensive.

This known canister-type chemical dispenser is limited in its use to chemicals of solid form which can be compressed into the single pellet for inserting into the canister. While a variety of such pellets are available for grasses, evergreens, roses, etc., the conventional canister-type dispenser cannot use irrigation chemicals of liquid, paste, powder, or granular form. Also, the irrigation chemicals will be dispensed any time there is water flow, so long as there is a chemical pellet in the dispenser canister. This may not be desirable with some chemicals, such as pesticides, which it is desired to leave on the vegetation as a coating to ward off insect pests.

Another conventional irrigation chemical dispenser is known in accord with U.S. Pat. No. 4,558,715. This teaching is believed to provide a dispenser wherein a drive piston is reciprocated by flowing water under control of a valve device. The drive piston, by its reciprocation, causes reciprocation also of a metering piston. The metering piston draws a selected liquid irrigation chemical from a source thereof and injects the liquid chemical into the water flow downstream of the drive piston.

Unfortunately, the device taught by the '715 patent is both somewhat complex in its construction, and expensive. This device controls the flow of liquid irrigation chemical as a percentage of the total water flow. Such precise control of the percentage of irrigation chemical is believed not to be necessary for an irrigation system to successfully meet the needs of the vegetation served thereby. All that need be effected, in contrast, is control of the quantity of chemical material dispensed according to the vegetation area or number of plants served by the irrigation system. Optionally, control of the time during an irrigation cycle during which the irrigation chemical is dispensed is desirable. The device according to the '715 patent is limited to use of liquid irrigation chemicals. Also, this device does not provide for dispensing of the irrigation chemical at the end of an irrigation watering cycle so as to leave the chemical on the vegetation.

SUMMARY OF THE INVENTION

In view of the deficiencies of the conventional irrigation chemical dispensers pointed out above, it is an object for the present invention to provide an irrigation chemical dispenser which is simple and inexpensive in its construction, and which provides for delivery of a premeasured quantity of chemical at a selected time during an irrigation cycle.

Another object for the present invention is to provide an irrigation chemical dispenser including a single-use disposable cartridge holding a premeasured quantity of selected irrigation chemical, which cartridge is sealed prior to its insertion into the dispenser of the present invention.

Still another object for the present invention is to provide an irrigation chemical dispenser allowing simple, convenient, and safe handling of the irrigation chemical.

An additional object for this invention is to provide single-use disposable irrigation chemical cartridges which are of varying sizes according to the area or number of vegetation to be served, and which are configured for cooporative use with the remainder of the dispenser according to the present invention.

Yet another object for this invention is to provide an irrigation chemical dispenser which includes a water flow control valve, an antisiphon valve, and a dispenser for irrigation chemical in a single compact unit.

Still another object of this invention is to provide an irrigation chemical dispenser of the above-described character wherein a sealed cartridge of irrigation chemical is automatically opened and dispensed by the dispenser upon the occurrence of a selected event.

Additional objects and advantages of the present invention will be apparent from a reading of the following detailed description of two particularly preferred embodiments of the invention, taken in conjunction with the appended drawing figures, in which:

BRIEF DESCRIPTION OF THE DRAWING FIGURES

FIG. 1 provides a perspective elevation view of an irrigation chemical dispenser embodying the present invention;

FIG. 2 provides a plan view of the irrigation chemical dispenser seen in FIG. 1;

FIG. 3 presents a somewhat schematic cross sectional view of the irrigation chemical dispenser depicted in FIGS. 1 and 2, and taken along line 3—3 of FIG. 2;

Figure 6:
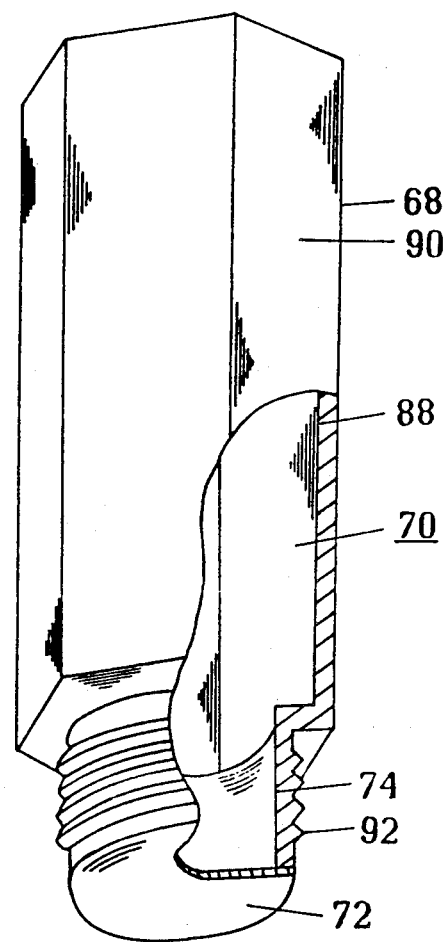

FIG. 6 presents a perspective view of a single-use disposable cartridge portion of an irrigation chemical dispenser, which cartridge receives a premeasured quantity of selected irrigation chemical material in accord with the present invention, and having a portion thereof broken away for clarity of illustration.

DETAILED DESCRIPTION OF THE PREFERRED EMBODIMENTS OF THE INVENTION

Figure 1:
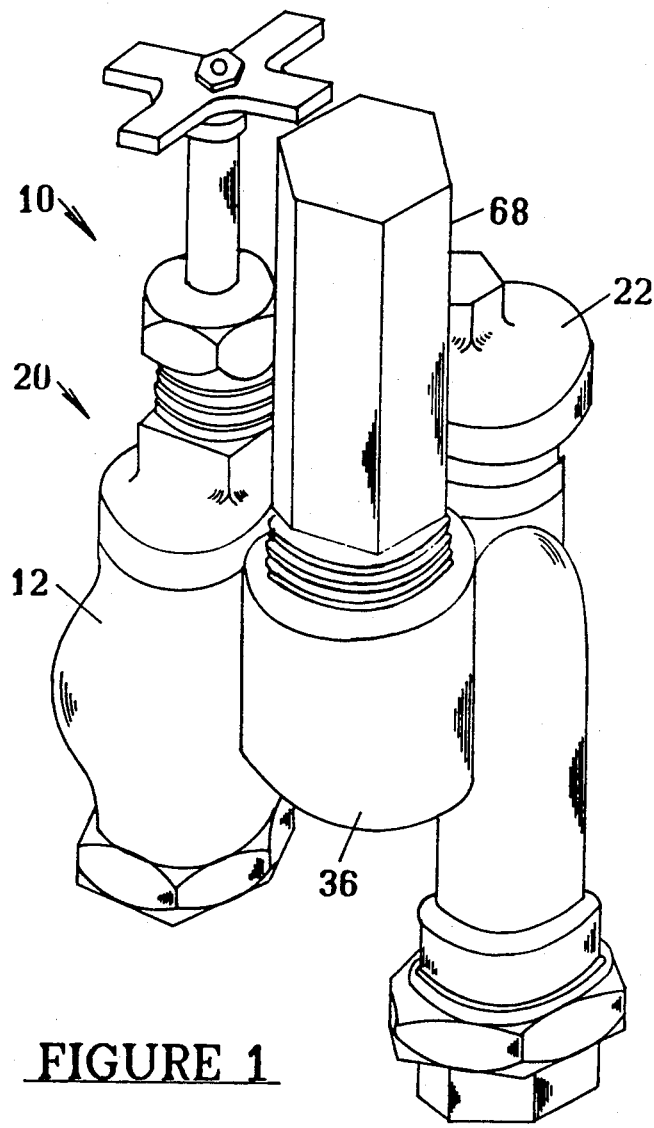
Figure 2:
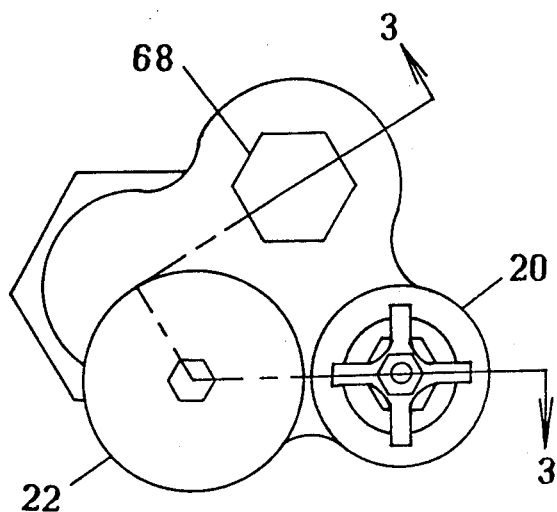
Figure 3:
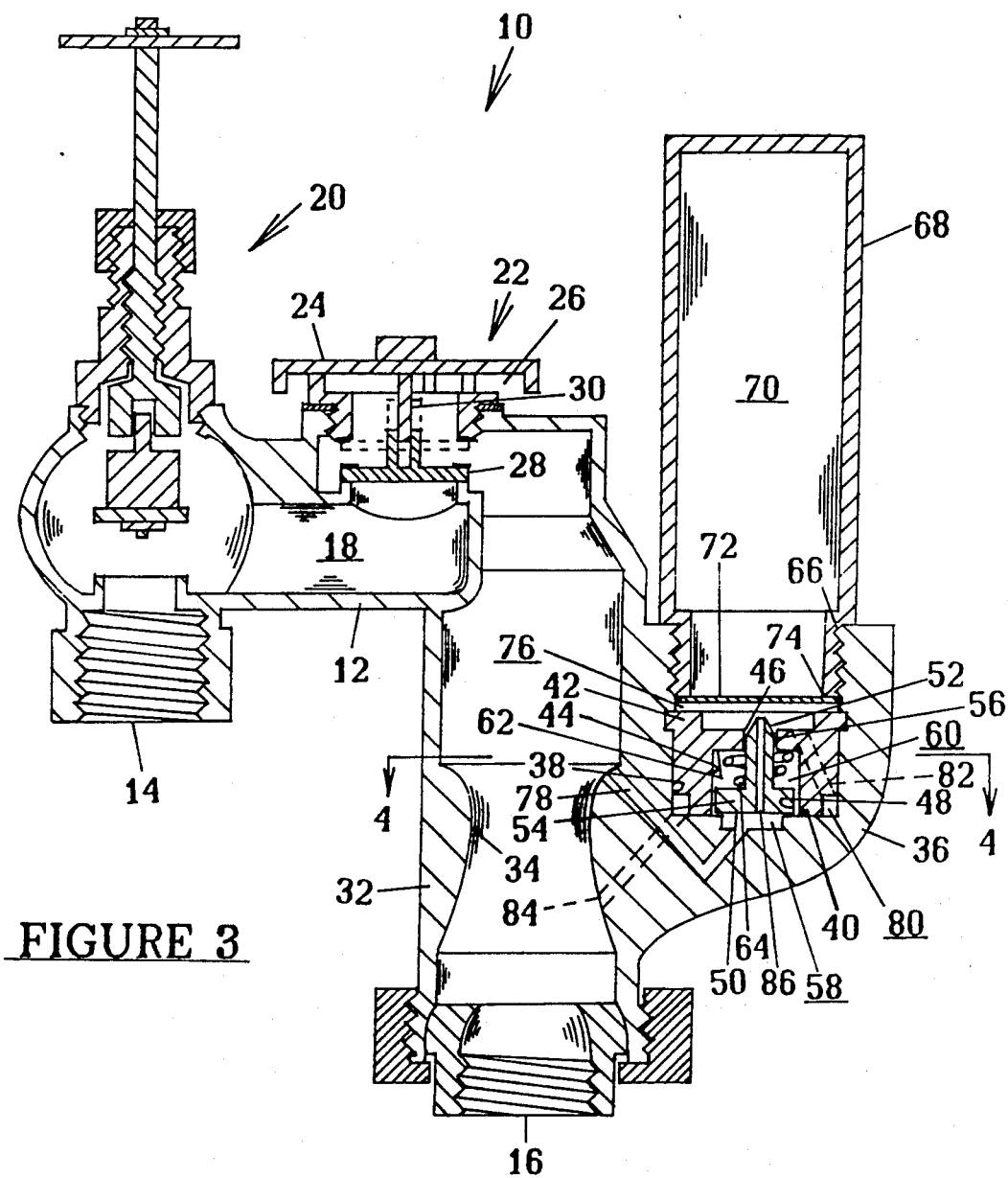

FIGS. 1, 2 and 3 depict a perspective elevation, plan, and cross sectional views, respectively, of an irrigation chemical dispenser 10 according to a preferred embodiment of the invention. The dispenser 10 includes a housing 12 defining an inlet port, generally referenced with the numeral 14, and an outlet port generally referenced with the numeral 16. The housing 12 also defines a flow path 18 extending between inlet port 14 and outlet port 16, viewing FIG. 3 particularly. The dispenser includes a manually operated globe valve 20, and an antisiphon valve 22. The antisiphon valve 22 includes a cap member 24 cooperating with the remainder of housing 12 to define a circumferential plurality of ports 26. The ports 26 communicate the flow path 18 with ambient. A disk-like valve member 28 is freely movably carried upon a stem 30 depending from the cap 24 and sealingly cooperates with the housing 12 in each of two operative positions. In a first operative position of the valve member 28, which is depicted in solid lines viewing FIG. 3, the latter closes communication to inlet port 14 from both of ambient via ports 26, and from the outlet port 16. In response to a flow of pressurized water in the flow path 18, which is admitted via inlet 14 when the valve 20 is opened, the valve member 28 moves to the second operative position thereof, which is depicted in dashed lines on FIG. 3. In this second operative position, the valve member 28 closes communication from flow path 18 to ambient via the ports 26.

Downstream of the valves 20 and 22, the housing 12 defines a constricting portion, generally referenced with the numeral 32. The constricting portion 32 of housing 12 defines a venturi section in flow path 18, which includes a venturi throat 34, or cross section of minimum fluid flow area. Adjacent to the constricting portion 32, the housing 12 also defines an outwardly extending boss portion 36. At the boss portion 36, the housing 12 defines an outwardly opening blind bore 38 (viewing FIG. 3). Sealingly received within the blind bore 38 adjacent to the end wall 40 thereof is an annular penetrater carrier member 42. The carrier member defines a stepped through bore 44 including a smaller diameter bore portion 46, and a larger diameter bore portion 48.

Figure 4:
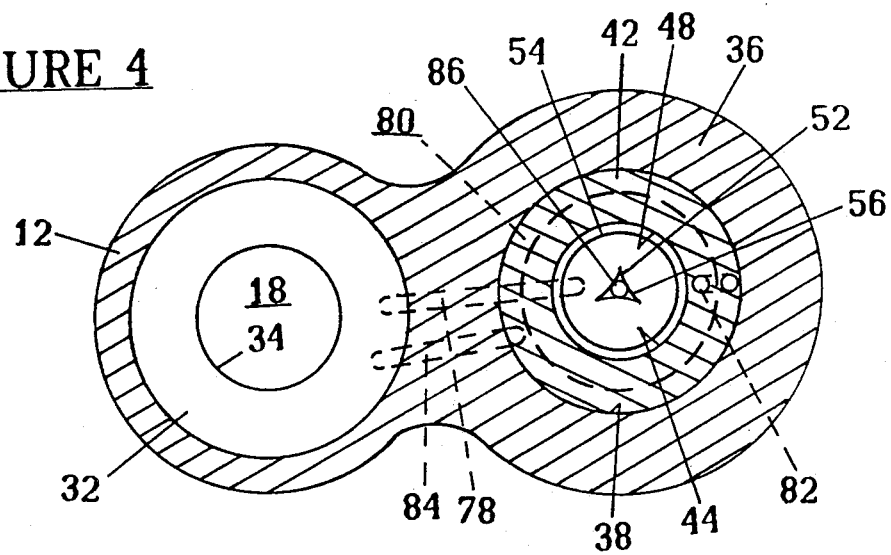
FIG. 4 is a fragmentary cross sectional view taken along line 4—4 of FIG. 3, with a part thereof omitted for clarity of illustration.

Movingly and sealingly received in the bore 44 is a penetrater member 50. The penetrater member 50 includes an elongate hollow needle-like portion 52 and a disk-like portion 54. The needle-like portion 52 is movably, but not sealingly received in the smaller diameter bore portion 46 of the bore 44, and includes a ribbed or fluted outer surface 56 (viewing FIG. 4). The disk-like portion 54 of the penetrater member 50 is movingly and sealingly received in the larger diameter portion 48 of bore 44. Thus, it will be understood that the disk-like portion 54 of the penetrater member 50 by its sealing cooporation with the carrier member 42 cooperates with the housing 12 to define a variable-volume chamber 58 on one side thereof (below the penetrater member, viewing FIG. 3). On the other side of the disk-like portion 54 a second variable-volume chamber 60 is defined in the bore 44, and is communicated outwardly thereof because the needle-like portion 52 does not sealingly engage the smaller diameter bore portion 46. Disposed within the chamber 60 and extending between a step 62 intermediate the bore portions 46-48, and the disk-like portion 54 is a conical coil spring 64. The spring 64 urges the penetrater member 50 downward into engagement with the end wall 40 of the bore 38. In this position of the penetrater member 50, the latter occupies a first operative position.

Outwardly of the penetrater carrier member 42, the bore 38 includes a thread-defining portion 66, wherein is threadably and sealingly received a single-use disposable cartridge member 68. This cartridge member 68 defines a chamber 70 therein, and includes a comparatively thin penetrable diaphragm member 72 closing the chamber 70 (viewing FIG. 6 in conjunction with FIGS. 1–4). The diaphragm member 72 spans the opening 74 of the cartridge member 68, and cooperates with the penetrater carrier member 42 to define a chamber 76. Within the chamber 70 of the cartridge member 68 may be disposed a premeasured supply of selected irrigation chemical (not shown). This irrigation chemical may be of any selected nature and consistency so long as it is water-soluble or may be dispersed in water. For example, the irrigation chemical may be in liquid form, or solid, or a powder or paste.

A passage 78 defined by the housing 12 communicates the flow path 18 upstream of the constricting portion 32 and venturi throat 34 thereof with the chamber 58. Similarly, the penetrater carrier member 42 cooperates with the housing 12 to define an annular chamber 80, while the carrier member includes a passage 82 communicating this chamber with the chamber 76. The housing 12 also includes a passage 84 communicating the chamber 80 with the flow path 18 at or downstream of the venturi throat 34. Finally, the penetrater member 50 defines an elongate through passage 86 extending through both the disk-like portion 54 and needle-like portion 52 thereof.

Having observed the structure of the irrigation chemical dispenser 10, attention may now be given to its method of operation. When the valve 20 is opened, a flow of water is conducted through the housing 12 from the inlet 14 to the outlet 16 via the flow path 18, and thence to an irrigation system (not shown) downstream thereof. This water flow in the flow path 18 moves the disk-like valve member 28 of the antisiphon valve 22 to its second operative position closing communication from the flow path 18 to ambient and results in a pressure drop across the venturi throat 34. Particularly, a decreased pressure level is realized at the venturi throat 34 with respect to water pressure level both upstream and downstream thereof. Also, the water pressure level upstream of the venturi throat 34 is higher than the water pressure downstream thereof because of incomplete pressure recovery through the venturi section of the flow path 18. Consequently, comparatively higher water pressure is communicated to chamber 58 by passage 78. The chamber 76 (and chamber 60) is communicated with comparatively lower water pressure via passage 84, chamber 80, and passage 82.

Consequently, the penetrater member 50 is subject to an upwardly directed force caused by the differing water pressures effective on the upper and lower faces of the disk-like portion 54 thereof. This upwardly directed force causes the disk-like portion 54 to move upwardly toward engagement with the step 62 on stepped through bore 44 in opposition to the spring 64. Simultaneously, the hollow needle-like portion 52 of the penetrater member is moved upwardly across the chamber 76 and pierces through the diaphragm 72. Because the outer surface 56 of the needle-like portion 52 is fluted or grooved, it does not create any loose diaphragm fragment or piece which could block or obstruct one of the small passages of the dispenser 10, and further, the portion 52 does not sealingly engage the diaphram 72 upon penetrating the latter. Instead, the needle-like portion 52 communicates the chamber 58 with the interior chamber 70 of the cartridge 68 while simultaneously communicating this chamber with the chamber 76.

In view of the above it is seen that a comparatively small portion of the water flow in flow path 18 is diverted into the chamber 70 of the cartridge 68 via passage 78, chamber 58, and the passage 86 of the hollow needle-like portion 52 of the penetrater member 50. This water flow into the chamber 70 therein disolves or mixes with selected irrigation chemicals according to the particular use of the dispenser 10. As has been pointed out above, the chemical selected for the cartridge 68 may be a pesticide, a fertilizer, or another chemical as desired. From the chamber 70 of the cartridge 68 a mixture of water and chemical flows to the flow path 18 via chamber 76, passage 82, annular chamber 80, and passage 84.

It will be understood that between operations of the irrigation system including dispenser 10, the cartridge 68 may be removed from the remainder of the dispenser by unthreading the later from the portion 66 of the bore 38. Removal of a spent single-use disposable cartridge 68 allows a new replacement cartridge to be installed into the dispenser 10 in anticipation of the next use of the irrigation system. Importantly, this new cartridge of irrigation chemical is sealed by its individual diaphragm 72 so that no hazard exists of spillage or exposure of humans or household pets to the irrigation chemical therein. Also, this new cartridge of irrigation chemical is preferrably selected from a range of available cartridge sizes with a view to the area or number of vegetation served by the associated irrigation system. In other words, the cartridge to be used in the irrigation system is selected with a view to its premeasured quantity of irrigation chemical, the nature of this chemical, and the vegetation area or number of plants served by the irrigation system, and to which the chemical is to be applied.

Attention now particularly to FIG. 6 will reveal that the cartridge 68 includes an elongate chambered body 88. The body 88 of the cartridge 68 importantly defines an elongate grip-defining surface 90. That is, the surface 90 is serrated, stirrated, or polygonal, for example, to afford a very good manual grip upon the cartridge 68. Thus, the spent cartridges may be removed from the dispenser 10, and new cartridges placed therein without the need to use a wrench or other tool. This feature of the dispenser 10 is important not only for convenience of use, but also to allow persons of comparatively poor hand strength to make use of the dispenser 10 by readily changing the cartridges thereof. Further, the cartridge 68 is seen to include a thread-defining neck portion 92. This thread-defining neck portion 92 defines the opening 74 into the chamber 70 and carries the diaphragm 72 closing this opening. It will be understood that the cartridge 68 depicted in FIG. 6, and in the other drawing Figures as well, is of an exemplary size only. In fact, the cartridge members 68 are intended to be of a graduated variety of sizes according to the content thereof, and the vegetation area or vegetation number which they are intended to serve. All these various cartridge members do, however, include a neck portion 92 and diaphragm 72 to permit their sealing engagement and cooperative use with the housing 12 of the dispenser 10.

Figure 5:
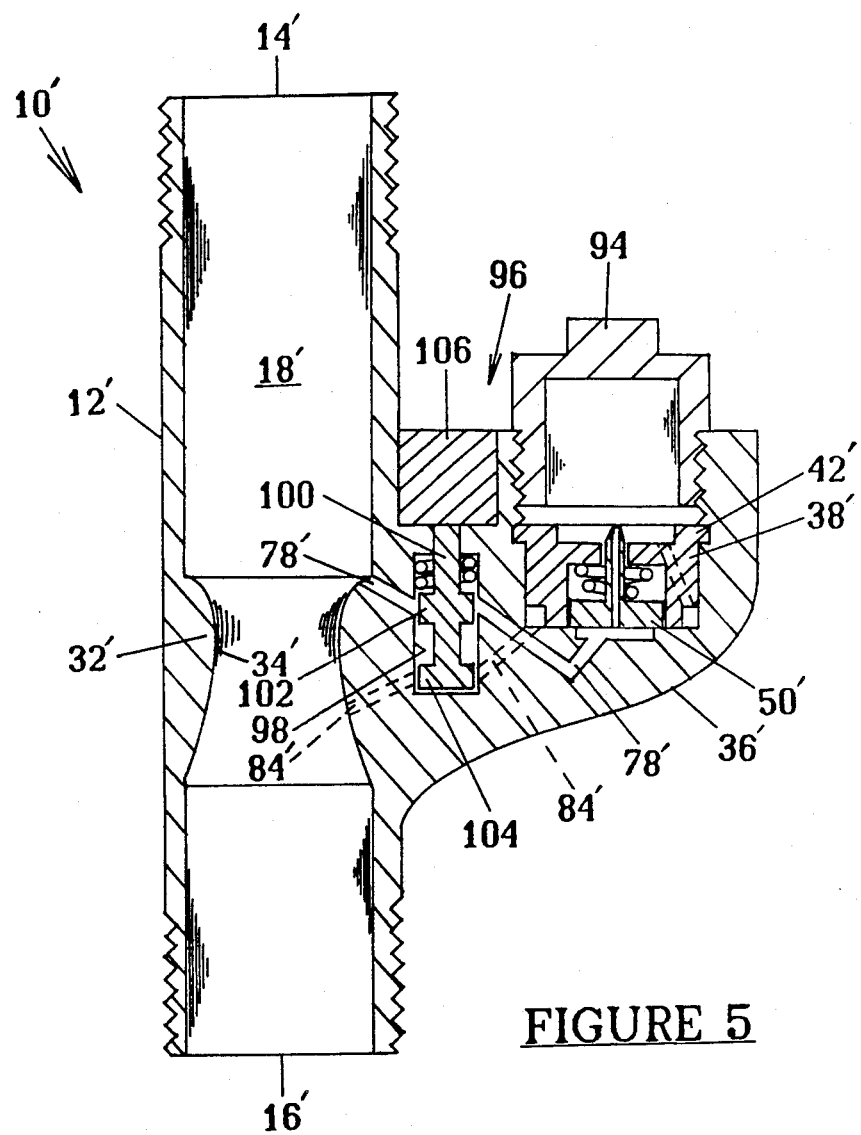
FIG. 5 is a schematic cross sectional view of an alternative embodiment of the invention.

FIG. 5 depicts an alternative embodiment of the invention. In order to obtain reference numerals for use in describing the embodiment of FIG. 5, features thereof which are similar in structure or function to that described above, are also used in connection with this embodiment with a prime added thereto. Viewing FIG. 5, it will be seen that an irrigation chemical dispenser 10' includes a housing 12' defining an inlet 14' and an outlet 16'. A flow path 18' communicates between the inlet 14' and outlet 16'. The housing 12' defines a constricting portion 32' whereat the flow path 18' includes a venturi throat 34'. Adjacent to the constricting portion 32' an outwardly extending boss portion 36' defines an outwardly opening blind bore 38'. The bore 38' and boss portion 36' receive a penetrater carrier member 42' and penetrater member 50' like that described above in connection with FIGS. 1–4. A chambered cartridge member 68 including a penetratable diaphragm member 72 may be sealingly and removably received in the bore 38'. However, for the sake of illustration, a removable plug member 94 is depicted sealingly and removably received in the bore 38'. The use of the plug member 94 permits the irrigation system associated with the dispenser 10' to be operated without the dispensing of irrigation chemicals. Alternatively, a spent (empty) irrigation chemical cartridge may be allowed to remain in the bore 38' when operation of the irrigation system without dispensing of chemicals is desired.

While the dispenser 10' does not include a water flow control valve like the globe valve 20, nor an antisiphon valve, it will be understood that the dispenser is included in a pipeline of a conventional irrigation system (not shown). This conventional irrigation system includes at least a water flow control valve upstream of the dispenser 10'. Preferably, the water flow control valve of the irrigation system is of the electrical solenoid-operated type. In this case, an irrigation cycle of the irrigation system is started and stopped by opening and closing the water flow control valve, respectively, under control of a conventional programmable irrigation timer.

Further, in contrast to the embodiment of the invention previously described, the embodiment of FIG. 5 includes a normally-closed solenoid valve 96 closing flow in both of the passages 78' and 84'. Thus, so long as the solenoid valve 96 is closed, water flow in the flow path 18' does not result in penetration of the diaphragm 72 and dispensing of the contents of a cartridge 68. However, the solenoid valve 96 may be opened by an input command thereto at a selected time during an irrigation cycle. Consequently, the penetrater member 50' will penetrate the diaphragm member 72, and the contents of the cartridge 54 will be dispensed to the vegetation served by the irrigation system. In this way, the irrigation chemical may be dispensed intermediate of the start and end of an irrigation cycle, for example. Also, the irrigation chemical may be dispensed at the end of an irrigation cycle so as not to be washed off by subsequent water flow, and to be left on the vegetation as a coating to ward off leaf chewing pests. In order words, the solenoid valve 96 is operated in timed coordination with the opening and closing of the water flow control solenoid valve (not shown) of the irrigation system including dispenser 10'.

Attention now more particularly to the solenoid valve 96 will reveal that the latter includes a bore 98 defined by housing 12', and intersecting both of the passages 78' and 84'. A stepped spool valve member 100 is movably and sealingly received in the bore 98. In a first position of the spool valve member 100, respective lands 102 and 104 thereof align with and close communication through passages 78' and 84'. The spool valve member 100 is selectively movable upwardly to a second position by a solenoid coil 106. In this second position of the spool valve member 100 communication through passages 78' and 84' is permitted while cross communication between these passages via bore 98 is prevented. Consequently, it is seen that when the solenoid valve 96 is in its first position the irrigation system including dispenser 10 may be operated without dispensing of chemical from the latter. However, if the irrigation system is operating and solenoid coil 106 is energized to move the spool valve member 100 to its second position, water flow to and from the bore 38' will occur to penetrate the diaphragm of and dispense the contents of any cartridge member received therein. Because the diaphragm member 72 of the cartridges 68 may not withstand domestic or irrigation water pressure applied thereto, the solenoid valve 96 is preferably configured to open and close both of the passages 78' and 84'. However, in areas having comparatively low domestic water pressure, or in situations otherwise resulting in the use of water of low pressure for irrigation, or if a sufficiently strong diaphragm member is provided on cartridges 68, the solenoid valve 96 may be configured to open and close only the passage 78'.

While the present invention has been depicted and described by reference to two particularly preferred embodiments thereof, no limitation on the invention is implied by such reference, and none is to be inferred. The invention is intended to be limited only by the spirit and scope of the appended claims, which provide additional definition of the invention. Many alterations and modifications of the invention will suggest themselves to those skilled in the pertinent art. For example, it is apparent that the embodiment of FIGS. 1–4 may include a solenoid operated water flow control valve rather than globe valve 20. Also, this embodiment may include a solenoid valve 96 to allow end-of-cycle dispensing of the irrigation chemical. Also, the penetrater member 50 could itself be driven directly by a solenoid. Further to the above, the cartridges 68, or selected ones thereof, may be made of transparent material, for example, a polymer material, so as to allow visual determination of the cartridge contents.

I claim:

1. An irrigation chemical dispenser comprising: a housing defining an inlet, an outlet, and a flow path extending from said inlet to said outlet for communicating a flow of water therebetween, said housing including a constricting portion intermediate of said inlet and said outlet whereat said flow path defines a venturi throat of minimum cross sectional flow area, an external boss portion of said housing adjacent said constriction portion defining a blind bore opening outwardly upon said housing, a chambered cartridge member for receiving therein a store of water-dispersable irrigation chemical removably and sealingly received in said bore, said cartridge member defining an opening from said chamber thereof within said housing bore, said cartridge member further carrying a penetrable diaphragm member closing said cartridge opening and cooperating with said housing to bound a first chamber within said bore, penetrating means for penetrating said diaphragm member and communicating said cartridge member chamber with said first chamber upon occurence of irrigation water flow in said flow path, and passage means for communicating water from said flow path to said cartridge member chamber and for communicating water mixed with said water-dispersable irrigation chemical to said flow path.

2. The invention of claim 1 wherein said irrigation chemical dispenser further includes selectively operable valve means disposed in said second passage means for selectively opening and closing communication between said flow path and said second chamber.

3. The invention of claim 2 wherein said selectively operable valve means includes a solenoid valve.

4. Irrigation chemical dispenser apparatus comprising a housing defining an inlet, an outlet, and a flow path extending from said inlet to said outlet for communicating a flow of water therebetween, said housing including a constricting portion whereat said flow path defines a venturi throat and an outwardly extending boss portion adjacent said constricting portion, said housing defining a passage communicating with said flow path and opening outwardly on said boss portion, a chambered cartridge member sealingly removably securing to said housing at said boss portion thereof and closing said passage, said cartridge member defining an opening from said chamber thereof communicable with said passage and a penetrable diaphragm member spanning said opening to close communication between said cartridge chamber and said passage, said cartridge member receiving therein at said chamber a quantity of selected water-dispersable irrigation chemical, and penetrating means cooperating with said housing and said cartridge member to penetrate said diaphragm in response to a flow of pressurized water in said flow path.

5. An irrigation chemical dispenser comprising: a housing defining an inlet, an outlet, and a flow path extending from said inlet to said outlet for communicating a flow of water therebetween, said housing including a constricting portion intermediate of said inlet and said outlet whereat said flow path defines a venturi throat of minimum cross sectional flow area, an external boss portion of said housing adjacent said constricting portion defining a blind bore opening outwardly upon said housing, a chambered cartridge member for receiving therein a store of water-dispersable irrigation chemical removably and sealingly received in said bore, said cartridge member defining an opening from said chamber thereof within said housing bore, said cartridge member further carrying a penetrable diaphragm member closing said cartridge opening and cooperating with said housing to bound a first chamber within said bore, penetrating means for penetrating said diaphragm member and communicating said cartridge member chamber with said first chamber upon occurence of a predetermined event, and passage means for communicating water from said flow path to said cartridge member chamber and for communicating water mixed with said water-dispersable irrigation chemical to said flow path, wherein said penetrating means includes a penetrating member sealingly and reciprocably received in said bore, said penetrating member cooperating with said housing to bound said first chamber and in a first portion confronting said diaphragm member, said penetrating member also cooperating with said housing to bound a second chamber expanding and contracting in opposition with said first chamber in response to reciprocation of said penetrating member, said passage means including first passage means for communicating said first chamber with said flow path at or down stream of said venturi throat, second passage means for communicating said second chamber with said flow path upstream of said venturi throat, and in response to a flow of water through said flow path said penetrating member moving to a second position wherein a needle-like portion thereof penetrates said diaphragm member to communicate said cartridge chamber with said first chamber, said penetrating member defining a through passage communicating said second chamber with said cartridge chamber in said second position of said penetrating member.

6. The invention of claim 5 wherein said housing further includes an annular penetrater carrier member received in said blind bore adjacent an end wall thereof, said penetrater carrier member sealingly cooperating with the remainder of said housing to define an annular chamber defining a part of said first passage means, said penetrater carrier member further defining a stepped through bore reciprocably receiving said penetrater member.

7. The invention of claim 6 wherein said penetrater member includes an elongate needle-like portion defining a longitudinally grooved or fluted outer surface and a longitudinal through passage.

8. The invention of claim 7 wherein said penetrater member further includes a disk-like portion sealingly and movably received in said stepped through bore, said needle-like portion extending perpendicularly from said disk-like portion and being received movingly and non-sealingly in said stepped through bore.

9. The invention of claim 8 wherein said stepped through bore defines a smaller diameter bore portion and a larger diameter bore portion, said needle-like portion being received in said smaller diameter bore portion, and said disk-like portion being received in said larger diameter bore portion.

10. The invention of claim 9 wherein said disk-like portion in said second position of said penetrater member engages a step defined on said stepped bore intermediate of said smaller diameter bore portion and said larger diameter bore portion.

11. The invention of claim 5 wherein said cartridge member includes an elongate body defining a manually grippable outer surface, a portion of said cartridge member body being receivable into said housing blind bore, said body portion defining said opening to said cartridge chamber, and said body portion carrying said diaphragm member closing said opening.

12. The invention of claim 5 wherein said irrigation chemical dispenser further includes valve means upstream of said venturi throat for selectively opening and closing fluid communication through said flow path to respectively allow and prevent water flow therein.

13. The invention of claim 12 wherein said valve means includes a manually operable globe valve.

14. The invention of claim 12 wherein said irrigation chemical dispenser further includes antisiphon valve means intermediate of said valve means and said venturi throat for opening communication between ambient and said flow path, said antisiphon valve means closing said communication with ambient in response to said flow of pressurized water in said flow path.

* * * * *